May 5, 1931.  A. DINA  1,803,465

ADJUSTABLE GENEVA INTERMITTENT

Filed Nov. 30, 1928   3 Sheets-Sheet 1

INVENTOR.
Augusto Dina
BY Howard W. Dix
his ATTORNEY

May 5, 1931.  A. DINA  1,803,465

ADJUSTABLE GENEVA INTERMITTENT

Filed Nov. 30, 1928  3 Sheets-Sheet 2

INVENTOR.
Augusto Dina
BY Howard W. Dix
his ATTORNEY

May 5, 1931. A. DINA 1,803,465
ADJUSTABLE GENEVA INTERMITTENT
Filed Nov. 30, 1928   3 Sheets-Sheet 3
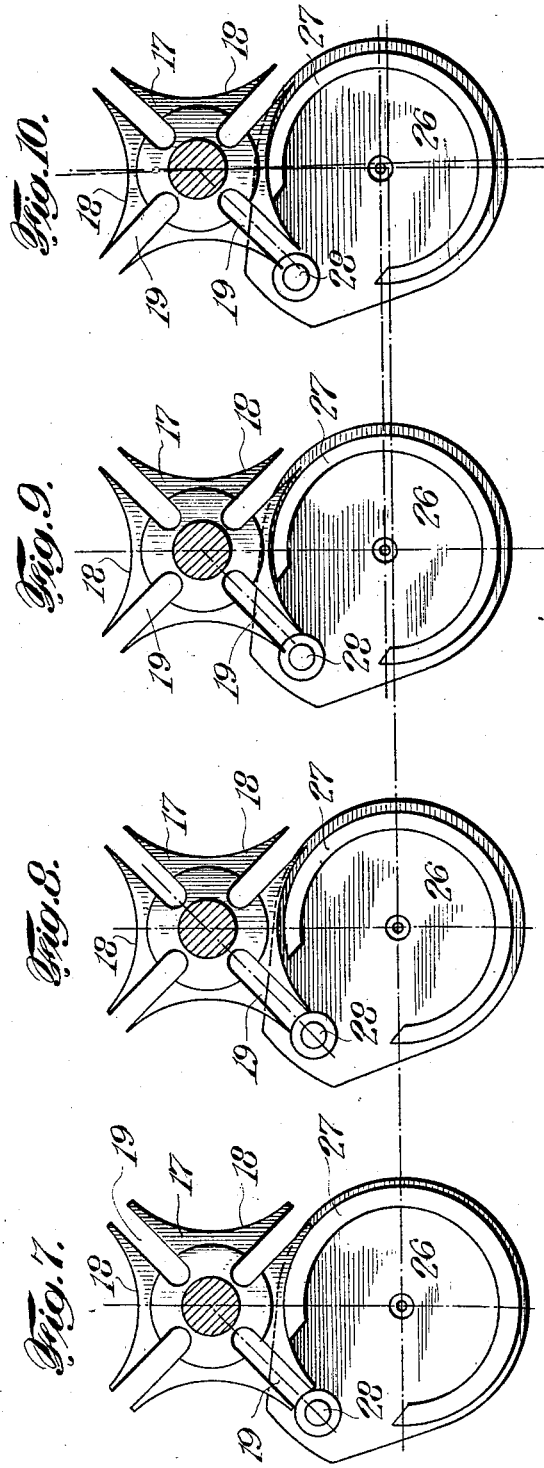
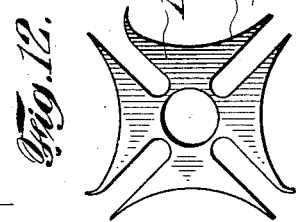
INVENTOR.
Augusto Dina
BY Howard W. Dix
his ATTORNEY.

Patented May 5, 1931

1,803,465

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

ADJUSTABLE GENEVA INTERMITTENT

Application filed November 30, 1928. Serial No. 322,696.

This invention relates to intermittent mechanical movements, and more particularly to mechanism for driving the intermittent sprocket of a motion picture projecting apparatus. The invention is applied specifically to the well known Geneva movement wherein one element is intermittently rotated by means of a continuously rotated driving element and provides means for adjusting the same to compensate for wear or inaccurate workmanship.

The Geneva movement, as employed in motion picture projecting apparatus for causing intermittent rotation of the film sprocket, comprises a star wheel having radially extending slots and a continuously rotating member having a pin for engaging said slots, and a cam for cooperating with a surface of said star wheel when the pin is disengaged. Upon each revolution of the continuously rotating member, the pin enters a slot in the star wheel and rotates the wheel through an angle of 90 degrees, thereby bringing the next slot into pin receiving position. The cam surface holds the star wheel stationary while the pin is disengaged, and maintains the slot in proper position with respect to the line of travel of the pin.

When the surfaces of the star wheel and of the cam have become worn, the star wheel will no longer be rigidly secured against movement, but will be free to rotate through a certain limited angle. This angular movement may be sufficiently great to throw the slot in the star wheel out of alignment with the pin on the rotating member and cause the pin, instead of entering the slot, to strike against the sides thereof. This may result in bending or breaking the points of the star wheel or in injury to the pin itself.

The present invention provides means for accurately adjusting the rotating member and the star wheel to compensate for wear and for variations in the manufacture thereof, while accurately maintaining the alignment of the various parts, whereby the pin is at all times prevented from contacting with the sides of the slots.

This is accomplished by forming the cam, and the cooperating portions of the star wheel, with tapered or frustro conical surfaces. As wear takes place the two elements are moved longitudinally of their axes for again bringing the surfaces into contact without varying the distances between their respective centers or throwing the pins and slots out of alignment.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a longitudinal sectional view of the intermittent sprocket and driving means therefor;

Figs. 7, 8, 9 and 10 are detail views of the star wheel and driving member showing various relative positions of the two elements; and Figs. 11 and 12 are elevations of star wheels which have been damaged due to improper alignment.

Like reference characters denote like parts in the several figures of the drawings.

Figure 1:
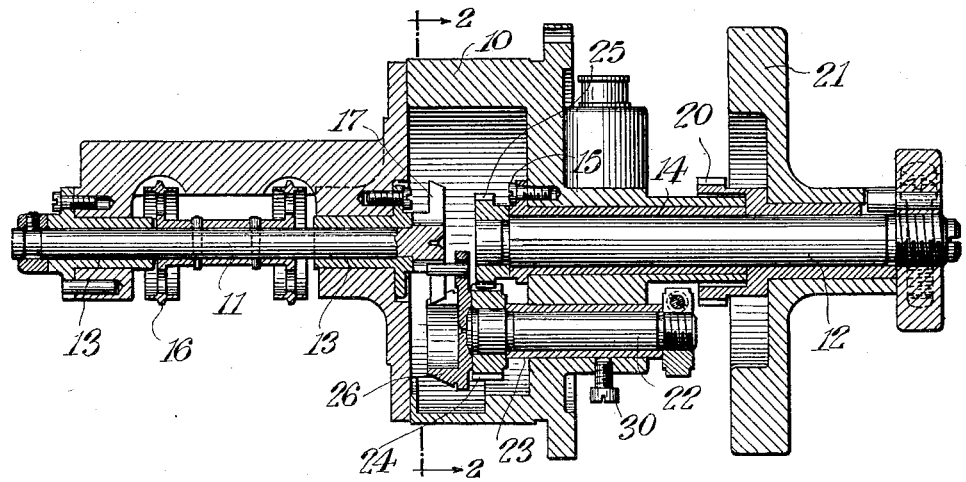
Figure 2:
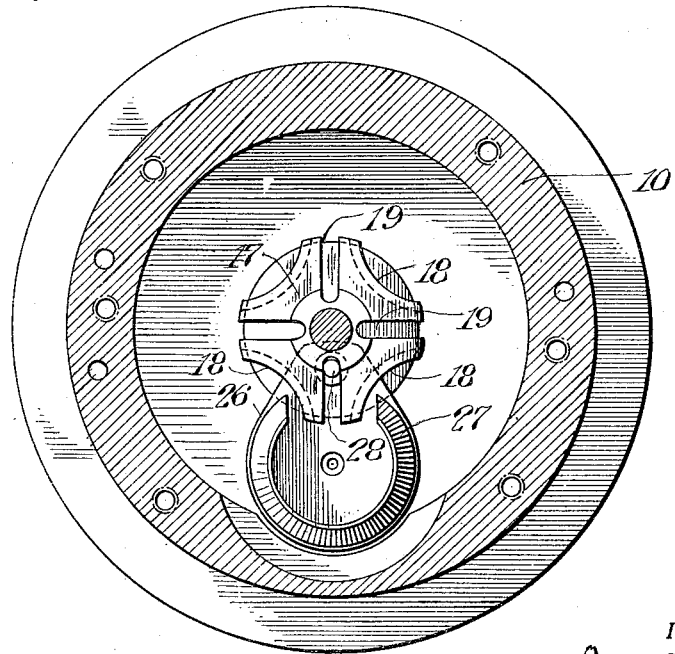
Fig. 2 is a section taken on the line 2—2 of Fig. 1.

In the following description and in the claims parts will be identified by specific names for convenience, but they are intended to be as generic in their application to similar parts as the art will permit.

Referring to the drawings more in detail, the invention is shown as applied to a Geneva movement comprising a base member or housing 10 in which shafts 11 and 12 are journalled.

Shaft 11 is rotatively held in bearings 13, secured in said housing 10 and shaft 12 is journalled in sleeve 14, which may be rigidly secured to housing 10, as by means of screw 15 passing through an extension in said sleeve and into an aligned opening in said housing.

Sprocket wheel 16 is rigidly secured to rotating shaft 11 and rotates in conjunction therewith, said sprocket being adapted to engage motion picture film and direct the same past the aperture plate of a projecting apparatus (not shown). Star wheel 17 is secured to the end of shaft 11 for driving the same in the manner to be hereinafter set forth. Said star wheel comprises a plurality of tapered or frustro-conical surfaces 18 and a plurality of radially extending slots 19, said slots being spaced around the periphery of said wheel by angles of 90 degrees.

Driving gear 20 and flywheel 21 are rigidly secured to shaft 12, said driving gear being adapted to receive power from a cooperating gear wheel (not shown). Flywheel 21 is designed to have sufficient inertia to prevent undue vibrations of the apparatus due to the sudden starting and stopping of the intermittent sprocket 11. Idler shaft 22 is journalled in sleeve 23, said sleeve being adjustably secured in housing 10, as by set screw 30. Gear wheel 24 is rigidly secured to said shaft 22 and is adapted to mesh with gear wheel 25 carried on the end of shaft 12. Member 26, having a frustro-conical cam surface 27 and a pin 28, is secured to shaft 22 adjacent gear wheel 24 and rotates in conjunction therewith.

Pin 28 is adapted to enter slot 19 in star wheel 17 and to rotate said star wheel through 90 degrees with each revolution of shaft 22. Cam 27 on member 26 cooperates with curved surface 18 on star wheel 17 for preventing movement of the star wheel while pin 28 is disengaged from slot 19. Shaft 22 may be longitudinally adjusted for bringing cam 27 and surface 18 into intimate contact by moving sleeve 23 in housing 10 and firmly securing the same as by means of set screw 30. The teeth of gear wheel 24 should preferably be sufficiently long to allow the desired longitudinal movement of shaft 22 without becoming disengaged from the cooperating teeth on gear wheel 25.

Figure 4:
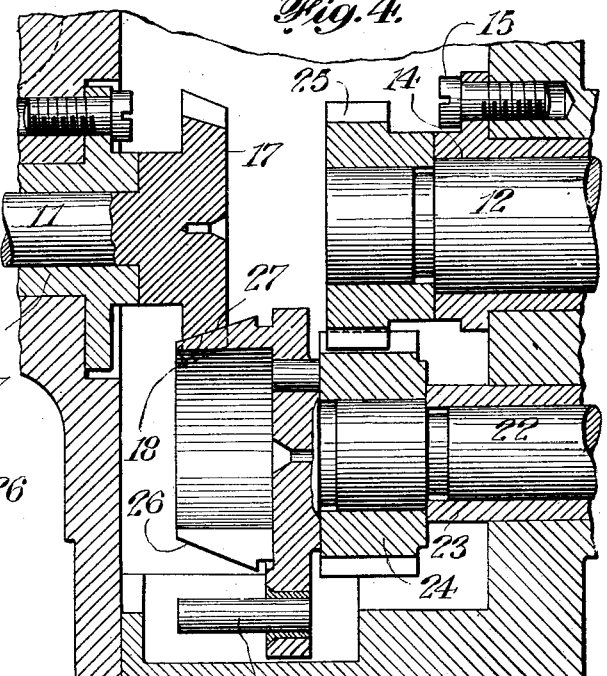
Fig. 4 is an enlarged sectional view showing the star wheel and driving member as initially assembled.
Figure 5:
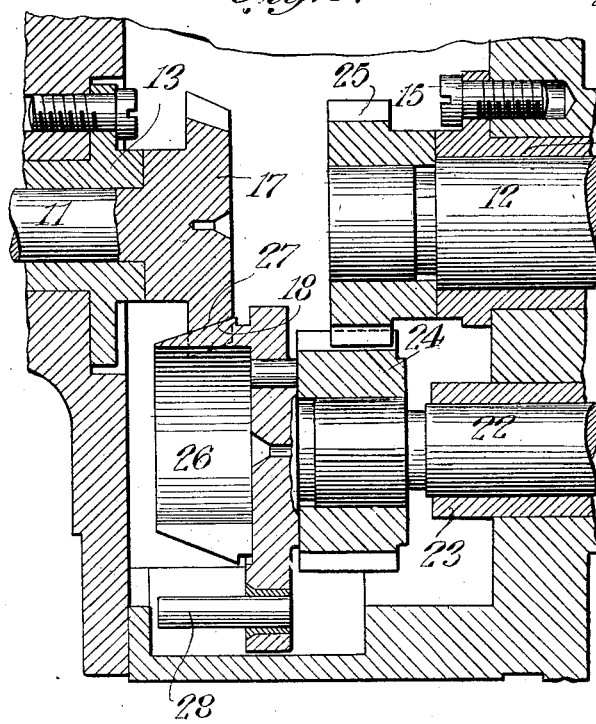
Fig. 5 is a sectional view similar to Fig. 4 showing the parts after adjustment for wear has been made.

Referring to Fig. 4, the relative position between cam member 26 and star wheel 17 is shown before wear of the cooperating surfaces has taken place. Fig. 5 shows the relationship subsequent to such wear and after cam member 26 has been moved longitudinally by a sufficient distance to compensate therefor, said movement again bringing surfaces 27 and 18 into engagement.

Figure 3:
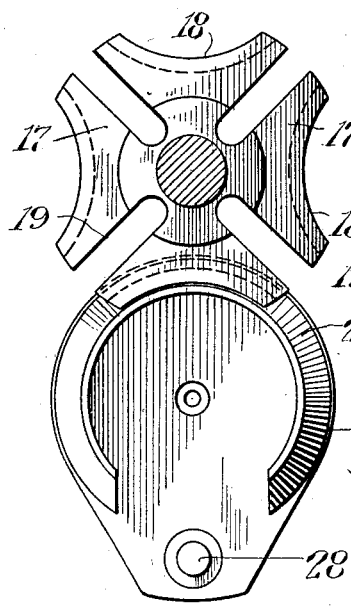
Fig. 3 is an enlarged view of the star wheel and driving member.

In the operation of the above described apparatus, shaft 22 and cam member 26 are continuously rotated in response to rotation of shaft 12 which is driven by any suitable source of power. Member 26, in rotating, causes pin 28 to enter a slot 19 in star wheel 17 and to turn said wheel 17 through 90 degrees. Cam 27 then cooperates with curved surface 18 and rigidly secures star wheel 17 against further movement after said pin 28 has become disengaged from said slot. The relative position of the parts, while surfaces 27 and 18 are in engagement, is more clearly shown in Fig. 3. Cam surface 27 is designed to securely hold star wheel 17 until pin 28 is again in position to enter a slot 19. Surface 18 is then released and a further 90 degree rotation of the star wheel permitted.

In the operation thus far described, it has been assumed that the parts are maintained in accurate alignment and that no wear has taken place. This condition is indicated in Fig. 7 wherein pin 28 is about to enter slot 19 in star wheel 17, the star wheel, however, being still engaged by surface 27, whereby the axis of slot 19 is caused to coincide with the axis of pin 28.

After wear has taken place, surfaces 27 and 18 may no longer be in accurate engagement and may become spaced apart as shown in Fig. 8. This condition may, of course, be obtained due to the wear of the parts or due to inaccurate workmanship or faulty assembly. As shown in Fig. 8, the axis of slot 19 still coincides with the axis of pin 28, whereby the pin will freely enter the slot and cause the desired rotation of star wheel 17. There is, however, no means for positively holding star wheel 17 in this position since surfaces 27 and 18 are now out of engagement. In fact, it would be extremely unlikely that such position would be assumed unless some positive means is provided for insuring the same.

Figs. 9 and 10 show the cam member 26 as slightly raised as in the old form of construction of the Geneva movement in an effort to compensate for the wear of the surfaces and to again bring the two parts in their desired relationship. In Fig. 9, although surfaces 18 and 28 are not brought into exact contact, star wheel 17 is shown in its most favorable position for receiving pin 28. It may be noted, however, that the axis of slot 19 no longer coincides with the axis of said pin and that upon further rotation of the cam member, the pin 28 will contact with the side of slot 19. Fig. 10 shows the condition which would obtain if star wheel 17 were rotated slightly from its optimum position, such rotation being allowed by the clearance between surfaces 27 and 18. In this position, pin 28 will positively bear against one of the sides of slot 19 with consequent injury to the apparatus. The sides of the slot or points, would be broken as shown in Fig. 11 or bent as shown in Fig. 12.

It is obvious therefore that a vertical adjustment of shafts 11 and 22 as shown in Figs. 9 and 10 cannot be employed for bringing surfaces 18 and 27 into contact. In accordance with the present invention, however, these two surfaces are constructed of a conical form, and adjustment is obtained by a relative longitudinal movement of shafts 11 and 22. In the specific embodiment disclosed, shaft 22 is adapted to be moved longitudinally by means of sleeve 23 and to be secured in any desired position as by set screw 30, although any other means may be employed if desired for causing the necessary relative movement of the parts.

Figure 6:
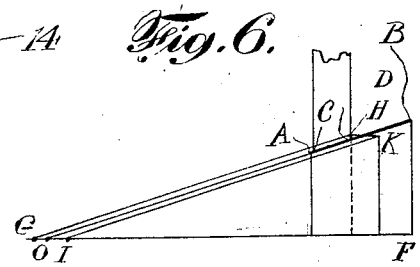
Fig. 6 is a diagrammatic illustration of the movement of the inclined surfaces for adjustment.

The adjustment is more clearly indicated in Fig. 6 wherein AB represents a portion of cam surface 27 and CD represents a cooperating portion of surface 18. The surfaces are inclined to their axes by the angle BOF. When surfaces 18 and 27 are worn down to lines GH and IK respectively they may again be brought into contact by moving surface 26 to the left, parallel to the axis OF by the distance HK.

It is evident that the alignment of the pin and slot, in the rotating member and star wheel respectively, is not altered by the above adjustment since the position of the axes of the two members is not changed thereby and the distance between centers is not varied. Consequently the line of movement of the pin during the rotation thereof, and the axes of the slots in star wheel 17, will remain in predetermined relationship. Since the angle BOF is less than 90 degrees, a comparatively large movement is required along the axis OF, in order to compensate for a small variation in the cooperating surfaces. The accurate adjustment of the two members is therefore facilitated.

In accordance with the present invention, by means of which cam 27 and surface 18 of the star wheel, are maintained in accurate adjustment, the slots in the star wheel are continually held in alignment with the line of travel of the pin. The pin is therefore prevented from contacting with the sides of the slots and from damaging the points of the star wheel. In fact, it has been found, in an apparatus constructed as above described, that the life of the star wheel is materially increased and with a resulting decrease in cost of maintenance.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

What is claimed is:

1. In a motion picture apparatus, a sprocket adapted to be intermittently rotated through comparatively small angles, a shaft carrying said sprocket and rigidly secured thereto, means for rotatably mounting said shaft, a star wheel secured to said shaft and having a plurality of radially extending slots and cam surfaces therebetween, means for driving said star wheel comprising a pin wheel having a pin adapted to engage said slots and a cam surface adapted to engage said first mentioned cam surfaces, said cam surfaces being tapered in the direction of their axes whereby relative longitudinal adjustment thereof serves to maintain said surfaces in engagement, a driving shaft rigidly secured to said pin wheel and carrying a driving gear, a bushing rotatably mounting said driving shaft and supporting the same against longitudinal movement, a support for said bushing, means for adjusting said bushing longitudinally of said driving shaft and clamping said bushing in said support, a gear substantially coaxial with said star wheel and in driving engagement with said driving gear, a shaft supporting said last mentioned gear wheel and a fly wheel carried by said shaft for maintaining substantially constant rotation thereof while said sprocket is being intermittently rotated.

2. In a motion picture apparatus, a sprocket adapted to be intermittently rotated through comparatively small angles, a shaft carrying said sprocket and rigidly secured thereto, means for mounting said shaft to permit rotational movement and to prevent longitudinal movement whereby the sprocket is maintained in correct optical position, a star wheel secured to said shaft and having a plurality of radially extending slots and cam surfaces therebetween, means for driving said star wheel comprising a pin wheel having a pin adapted to engage said slots and a cam surface adapted to engage said first mentioned cam surfaces, said cam surfaces being tapered in the direction of their axes whereby relative longitudinal adjustment thereof serves to maintain said surfaces in engagement, a driving shaft rigidly secured to said pin wheel and carrying a driving gear, a bushing rotatably mounting said driving shaft and supporting the same against longitudinal movement, a support for said bushing, means for adjusting said bushing longitudinally of said driving shaft and clamping said bushing in said support, a gear substantially coaxial with said star wheel and in driving engagement with said driving gear, a shaft supporting said last mentioned gear wheel and a fly wheel carried by said shaft for maintaining substantially constant rotation thereof while said sprocket is being intermittently rotated, the arrangement permitting longitudinal adjustment of the pin wheel to compensate for wear while maintaining said sprocket in its original optical position.

AUGUSTO DINA.